(12) United States Patent
Wroblewski et al.

(10) Patent No.: US 11,916,251 B1
(45) Date of Patent: Feb. 27, 2024

(54) PHASE-CHANGE MATERIAL CONTROLLED VENT FOR THERMAL RUNAWAY MITIGATION IN ENERGY STORAGE SYSTEM

(71) Applicant: GM GLOBAL TECHNOLOGY OPERATIONS LLC, Detroit, MI (US)

(72) Inventors: Benjamin G. Wroblewski, Ferndale, MI (US); Jordan Mullins, Longmont, CO (US); Brian Carrier, Des Moines, IA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/882,726

(22) Filed: Aug. 8, 2022

(51) Int. Cl.
| | |
|---|---|
| *H01M 50/375* | (2021.01) |
| *H01M 50/258* | (2021.01) |
| *H01M 10/48* | (2006.01) |
| *H01M 10/63* | (2014.01) |
| *H01M 10/6563* | (2014.01) |
| *H01M 10/613* | (2014.01) |

(52) U.S. Cl.
CPC ....... *H01M 50/375* (2021.01); *H01M 10/486* (2013.01); *H01M 10/613* (2015.04); *H01M 10/63* (2015.04); *H01M 10/6563* (2015.04); *H01M 50/258* (2021.01); *H01M 2220/20* (2013.01)

(58) Field of Classification Search
CPC ... H01M 50/375; H01M 10/613; H01M 10/63
See application file for complete search history.

(56) References Cited

U.S. PATENT DOCUMENTS

2015/0035370 A1* 2/2015 Wyatt ................ B60L 58/20
307/77
2018/0358671 A1* 12/2018 Halsey .............. H01M 10/6557

* cited by examiner

*Primary Examiner* — Olatunji A Godo
(74) *Attorney, Agent, or Firm* — Quinn IP Law

(57) ABSTRACT

A multi-cell rechargeable energy storage system (RESS) includes a plurality of battery cells organized into battery modules and a first enclosure configured to house the battery modules. The RESS also includes a first vent arranged on the first enclosure and configured to direct air from inside the first enclosure to an environment external to the first enclosure. The RESS additionally includes a second vent arranged on the first enclosure and configured to direct air into the first enclosure from the environment external to the first enclosure. The RESS further includes a phase-change material (PCM) device arranged on the second vent and configured to melt in response to at least one of the battery modules experiencing a thermal runaway event. In combination with the first vent, the PCM generates crossflow ventilation through the first enclosure to cool the battery modules therein and mitigate thermal runaway.

20 Claims, 5 Drawing Sheets

PHASE-CHANGE MATERIAL CONTROLLED VENT FOR THERMAL RUNAWAY MITIGATION IN ENERGY STORAGE SYSTEM

INTRODUCTION

The present disclosure relates to a battery module top cover configured to remove heat and mitigate a thermal runaway event in the battery module.

An electrical energy storage or battery system or array may include a plurality of battery cells in relatively close proximity to one another. A plurality of battery cells may be assembled into a battery stack or module, and a plurality of battery modules may be assembled into a battery pack. In large battery packs, an individual pack may also be split into separate battery sub-packs, each including an array of battery modules. Batteries may be broadly classified into primary and secondary batteries.

Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries. Rechargeable batteries may be used to power such diverse items as toys, consumer electronics, and rotary electric machines, such as electric motors-generators or traction motors for electric propulsion of motor vehicles.

Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the module and cause the thermal runaway event to affect the entire battery array.

SUMMARY

A multi-cell rechargeable energy storage system (RESS) includes a plurality of battery cells organized into battery modules and a first enclosure configured to house the battery modules. The RESS also includes a first vent arranged on the first enclosure and configured to direct air from inside the first enclosure to an environment external to the first enclosure. The RESS additionally includes a second vent arranged on the first enclosure and configured to direct air into the first enclosure from the environment external to the first enclosure. The RESS further includes a phase-change material (PCM) device arranged on the second vent and configured to melt in response to an increase of temperature inside the first enclosure from at least one of the battery modules experiencing a thermal runaway event. In combination with the first vent, the PCM generates crossflow ventilation through the first enclosure to cool the battery modules therein and mitigate thermal runaway.

The RESS may be a stationary system additionally including a second enclosure configured to house the first enclosure including the battery modules.

The second enclosure may include a baffle configured to admit airflow into the second enclosure from an environment external to the second enclosure.

The RESS system may be a mobile system configured to supply electrical energy to a vehicle power-source.

The RESS system may additionally include a fan configured to pull, through the first vent, the air directed by the first vent from inside the first enclosure and thereby exhaust the air to the environment external to the first enclosure.

The RESS system may additionally include an electronic controller configured to regulate operation of the fan in response to temperature detected inside the first enclosure.

The PCM device may be a stainless-steel tape, such as a 304 stainless steel foil with an acrylic adhesive.

The PCM device may be a thermoset molded component, and the material of the PCM device may be a polymeric composite.

The PCM device may be a thermoplastic injection molded component. In such an embodiment, the material of the PCM device may be polyamide 6 reinforced with 15% glass fiber (PA6-GF15).

A motor vehicle having a power-source and the above-disclosed mobile RESS configured to supply electric energy to the power-source is also considered.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
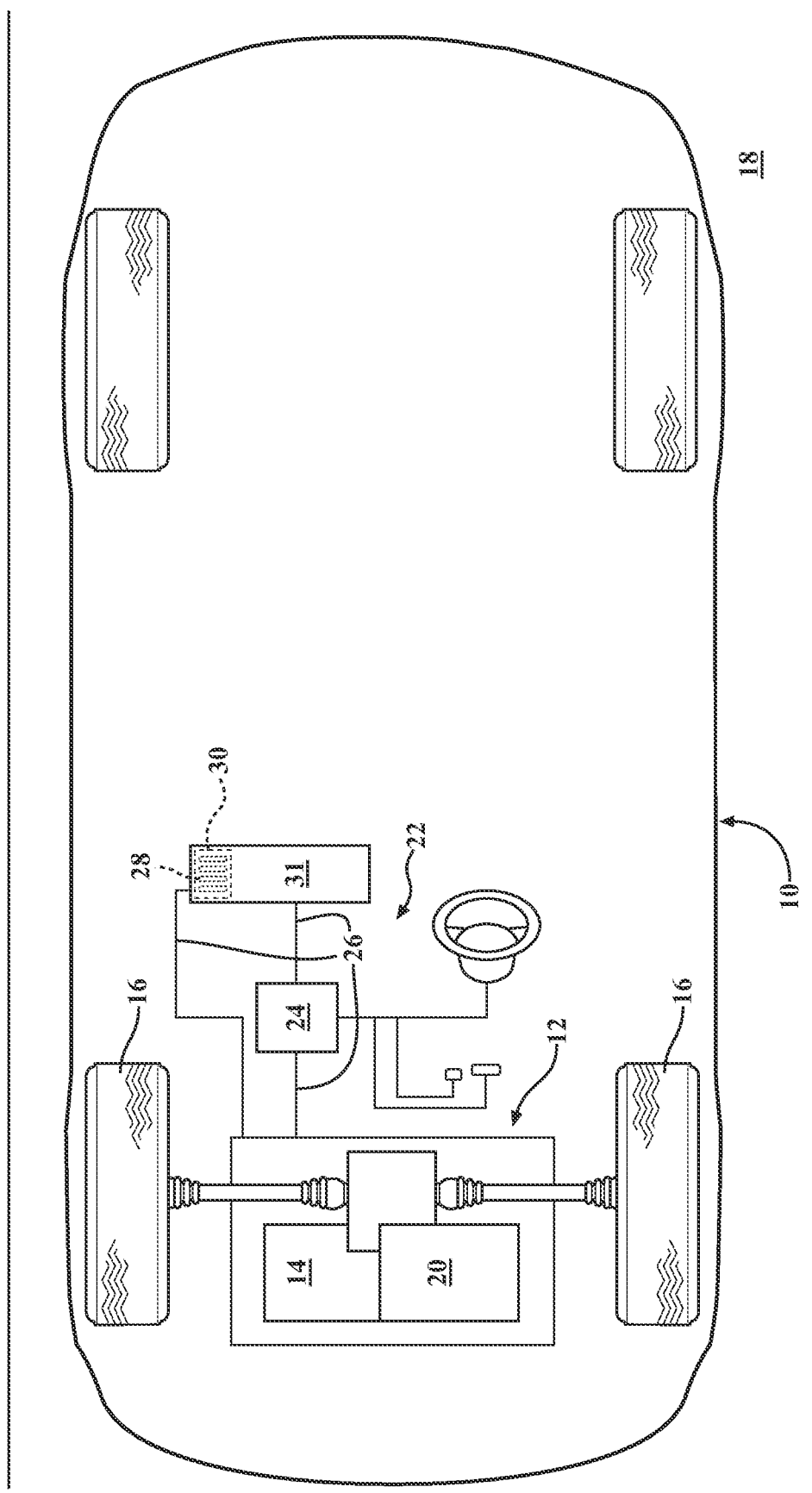
FIG. 1 is a schematic top view of an embodiment of a motor vehicle employing multiple power-sources and a mobile multi-cell rechargeable energy storage system (RESS) including a plurality of battery cells arranged in one or more modules configured to generate and store electrical energy.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train, or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes a multi-cell rechargeable energy storage system (RESS) 22. The RESS 22 is configured to generate and store electrical energy through heat-producing electro-chemical reactions for supplying the electrical energy to the power-sources 14 and 20. Accordingly, the RESS 22 incorporated into the motor vehicle 10 is configured as a mobile system. Operation of the powertrain 12 and the RESS 22 may be generally regulated by an electronic controller 24. The electronic controller 24 may be a central processing unit (CPU) that regulates various functions of the vehicle 10, or a powertrain control module (PCM) configured to control the powertrain 12 to generate a predetermined amount of power-source torque T.

Figure 2:
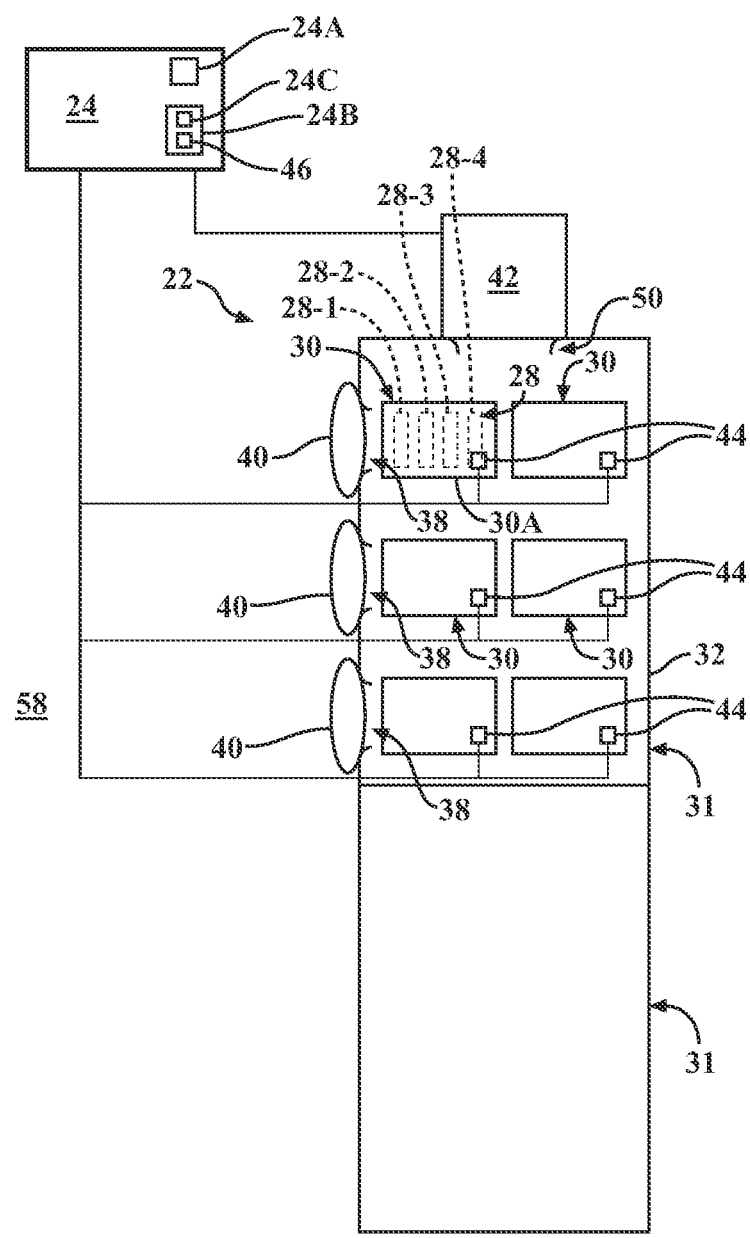
FIG. 2 is a schematic view of the mobile RESS shown in FIG. 1, having a first system enclosure, first and second vents, a phase-change material (PCM) device arranged on the second vent, and a fan, according to the disclosure.
Figure 3:
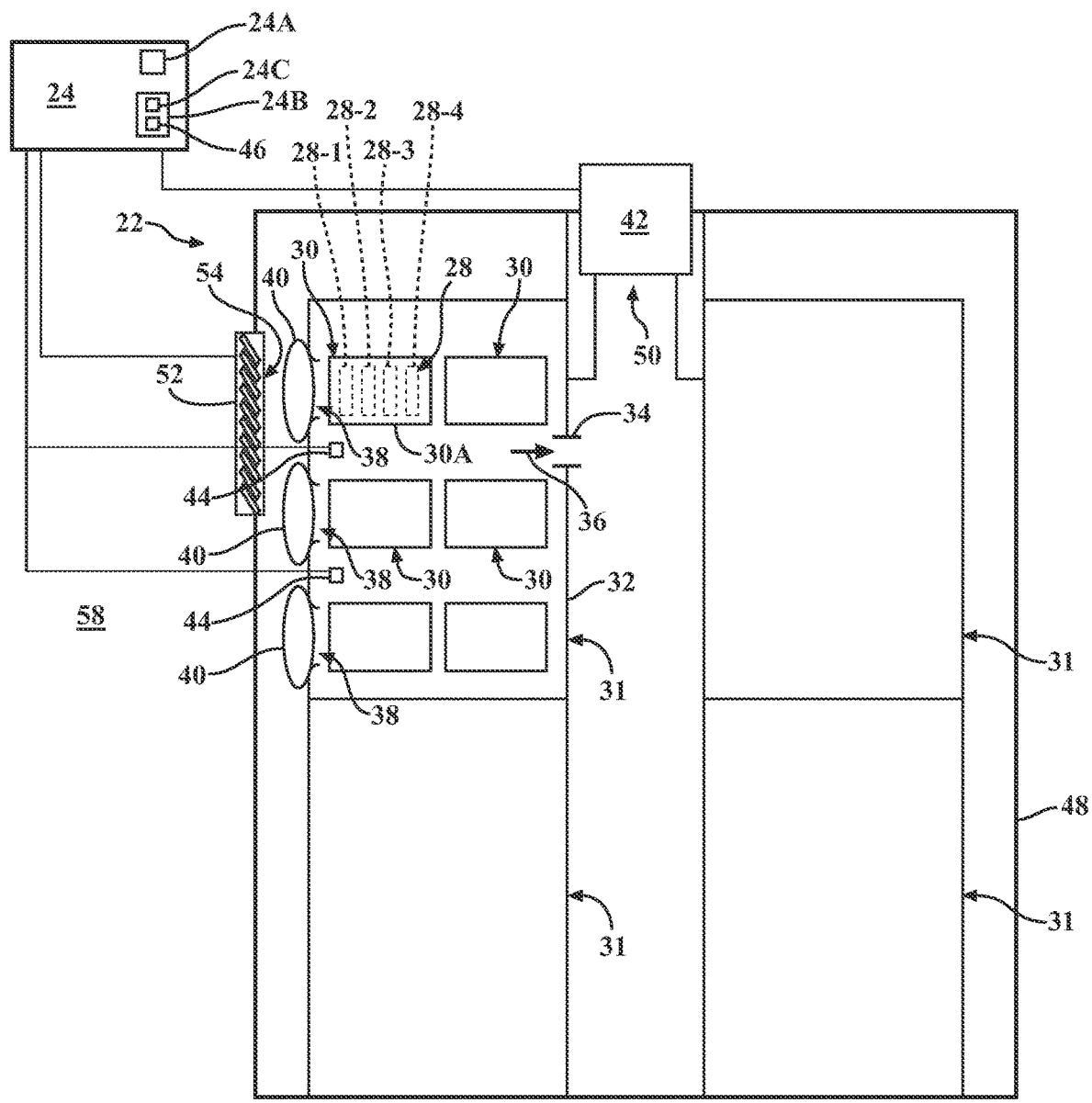
FIG. 3 is a schematic view of a stationary RESS, having the first system enclosure, the first and second vents, the PCM device arranged on the second vent, and a fan, as shown in FIG. 2, as well as a second system enclosure, and a baffle for admitting airflow into the second enclosure ambient environment, according to the disclosure.

The RESS 22 may be operatively connected to the power-sources 14 and 20, the electronic controller 24, as well as other vehicle systems via a high-voltage BUS 26 (shown in FIG. 1). Although the RESS 22 has thus far been described with respect to a vehicle environment, nothing precludes the subject RESS from having a stationary application to power a different, non-automotive system (shown in FIG. 3). A general structure of the RESS 22 is schematically shown in FIG. 2. As shown, a plurality of battery cells 26 may be initially combined into cell groups 28, where the individual cells may be electrically connected, for example, in parallel. The cell groups 28 may be subsequently organized into battery modules 30, where the individual cell groups may be electrically connected, for example, in series. Although six individual modules 30 are shown in FIG. 2, the RESS 24 may have as many such modules as desired. As shown in FIGS. 2 and 3, a plurality of modules 30 may also be arranged and organized into individual battery packs or sub-packs 31.

As shown in FIGS. 2 and 3, each cell group 28 includes a plurality of battery cells, such as a first battery cell 28-1 and a neighboring, directly adjacent, second battery cell 28-2. Although four battery cells 28-1, 28-2, 28-3, 28-4 are shown, nothing precludes each cell group 28 from having a smaller or greater number of such battery cells. Each battery module 30 may have a respective module housing 30A separating individual modules from one another within the RESS 22. As shown in FIGS. 2 and 3, the RESS 22 also includes a first system enclosure 32 configured to house the battery modules 30. The RESS 22 also includes a first vent 34 arranged on the first enclosure 32. The first vent 34 is configured to direct air 36 from inside the first enclosure 32 to an environment 36 external to the first enclosure. The RESS 22 additionally includes one or more second vents 38 arranged on the first enclosure 32. When open, each second vent 38 is configured to direct the air 36 into the first enclosure 32 from the environment 36 external to the first enclosure.

As shown in FIGS. 2 and 3, the RESS 22 also includes one or an array of phase-change material (PCM) devices 40. Specifically, each PCM material device 40 is configured to transition from a solid state to a liquified state during absorption of thermal energy. Each PCM device 40 is arranged on the respective second vent 38 and configured to melt in response to a significant temperature increase inside the first enclosure 32. Such a temperature increase may specifically occur due to at least one of the battery modules 30 undergoing or experiencing a thermal runaway event 41 (shown in FIG. 4). The term "thermal runaway event" generally refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

The melting of the PCM device(s) 40 during the thermal runaway event 41 is configured to, in combination with the first vent 34, generate crossflow ventilation through the first enclosure 32 using the air 36 to cool the battery modules 30 inside the first enclosure. The crossflow ventilation thereby mitigates the spread of thermal runaway within the RESS 22 from the already affected module(s) 30 to the unaffected areas of the RESS. The RESS 22 may additionally include a fan 42. The fan 42 may be arranged proximate to the first enclosure 32 or mounted thereto. The fan 42 is specifically configured to pull through the first vent 34 the air 36 directed by the first vent from inside the first enclosure 32 and thereby exhaust the air to the environment 36 external to the first enclosure.

Figure 5:
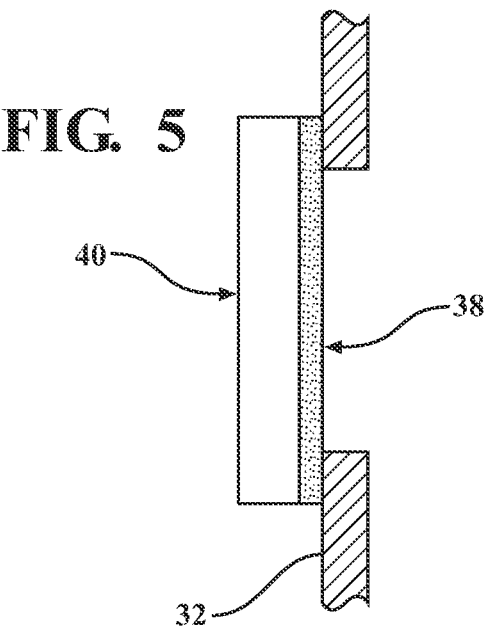
FIG. 5 is a schematic close-up cross-sectional view of a particular embodiment of the PCM device, according to the disclosure.
Figure 6:
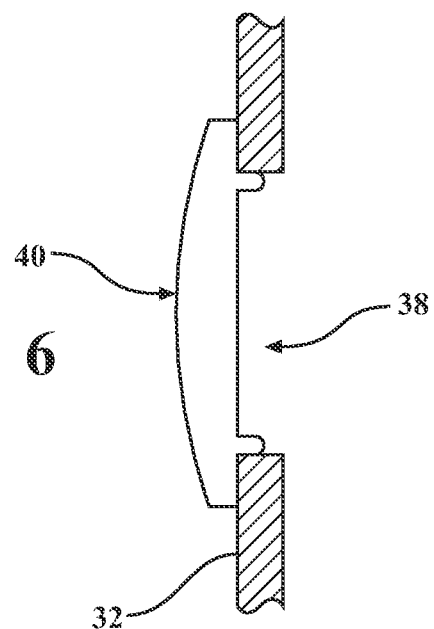
FIG. 6 is a schematic close-up cross-sectional view of another embodiment of the PCM device, according to the disclosure.
Figure 7:
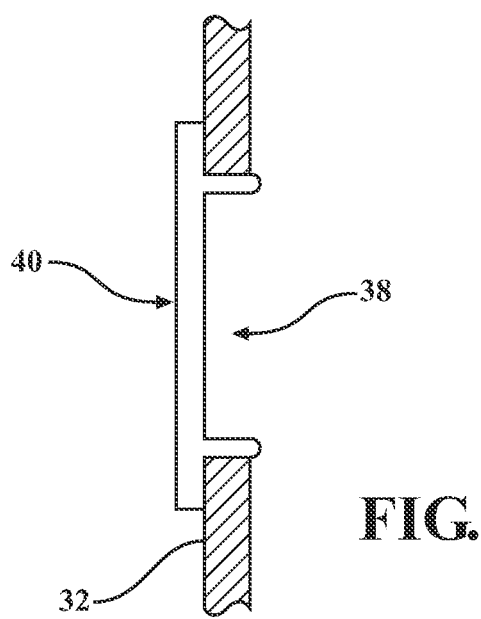
FIG. 7 is a schematic close-up cross-sectional view of yet another embodiment of the PCM device, according to the disclosure.

Each PCM device 40 may be a stainless-steel tape (shown in FIG. 5), for example, 304 stainless steel foil backed with a high-temperature acrylic adhesive. Such a stainless-steel tape may have a thickness in a 0.001 to 0.006 inch (0.0254 to 0.1524 mm) range. The PCM device 40 shown in FIG. 5 may be bonded to the first enclosure 32 at the aperture 38. In another embodiment, each PCM device 40 may be a thermoset molded component (shown in FIG. 6). Specifically, the material of the thermoset molded PCM device 40 may be a polymeric composite, e.g., a resin. The PCM device 40 shown in FIG. 6 may be overmolded with the first enclosure 32 at the aperture 38. In yet another embodiment, each PCM device 40 may be a thermoplastic injection molded, engineering plastic component (shown in FIG. 7). Specifically, the material of the thermoplastic molded PCM device 40 may be polyamide 6 reinforced with 15% glass fiber (PA6-GF15), used for its high rigidity and dimensional stability and sufficiently high melting temperature of around 220 degrees Celsius. The PCM device 40 shown in FIG. 7 may be pressed into or otherwise affixed to the first enclosure 32 at the aperture 38.

The RESS 22 may include the electronic controller 24, which, in the mobile system, may be the electronic controller used by the motor vehicle 10. In the stationary system, the electronic controller 24 may be a dedicated unit programmed to operate the RESS 22. As shown in FIG. 1, the electronic controller 24 may include a computer and/or processor 24A, and include software, hardware, memory, algorithms, connections, etc., for managing and controlling operation of the RESS 22. The electronic controller 24 may be embodied as one or multiple digital computers or host machines, each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, input/output (I/O) circuitry, I/O devices, and communication interfaces, as well as signal conditioning and buffer electronics.

The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk or hard disk, magnetic tape or other magnetic medium, a CD-ROM, DVD, and/or other optical medium, as well as other possible memory devices such as flash memory. The electronic controller 24 also includes a tangible, non-transitory memory 24B (shown in FIG. 1) on which computer-executable instructions, including one or more algorithms 24C, for regulating operation of the RESS 22 are recorded. Algorithms required by the controller 24 or accessible thereby may be stored in the memory and automatically executed to provide the required functionality.

As shown in FIG. 1, the electronic controller 24 may, for example, be in wireless communication or in wired communication with the RESS 22, such as via the high-voltage BUS 26. The electronic controller 24 may be configured, i.e., structured and programmed, to communicate with one or more temperature sensors 44 (shown in FIGS. 2-4) and receive therefrom a signal indicative of temperature detected inside the first enclosure 32. Specifically, each temperature sensor 44 may be arranged inside a respective module 30 (shown in FIG. 2) or proximate PCM device(s) 40 (shown in FIGS. 3 and 4). As a result, the electronic controller 24 may be configured to monitor the temperature inside the first enclosure 32 via the temperature sensors 44. The electronic controller 24 may be further configured to regulate operation of the fan 42, such as via one of the algorithms 24C. The electronic controller 24 may be configured to turn on the fan 42 in response to the temperature inside the first enclosure 32 reaching a predetermined value 46, as detected by the sensor(s) 44, and/or the melting of one or more of the PCM devices 40. The predetermined value 46 may be 100 degrees Celsius or higher.

Figure 4:
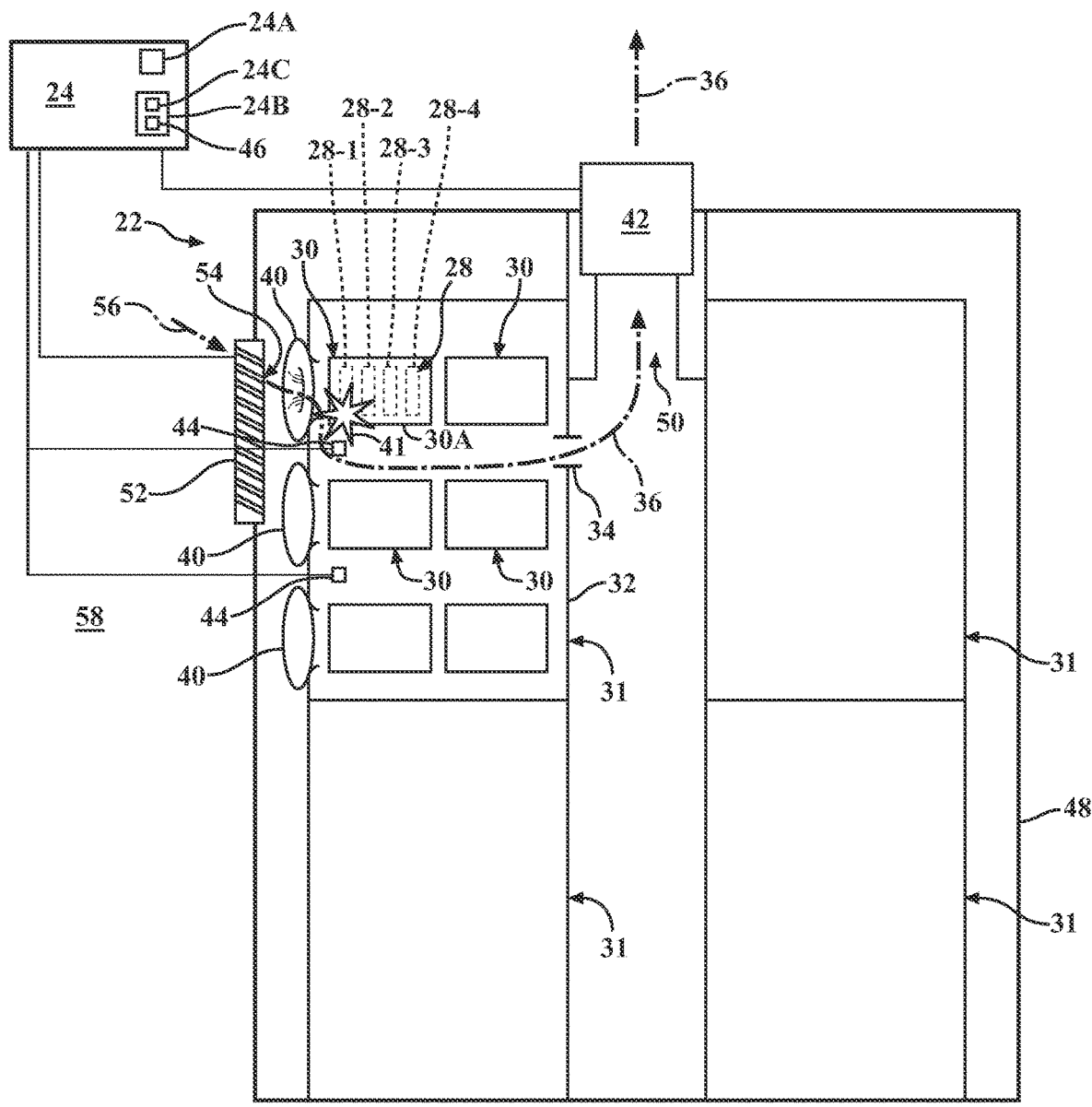
FIG. 4 is a schematic view of a stationary RESS having a module undergoing a thermal runaway event and the crossflow ventilation provided by the combination of the first and second vents, the PCM device arranged on the second vent, as well as the fan, and the baffle shown in FIG. 3, according to the disclosure.

In the embodiment where the RESS 22 is a stationary system, the RESS may further include a system second enclosure 48. The second enclosure 48 may define an aperture 50 and be configured to house the first enclosure 32, including the battery modules 30. As shown in FIGS. 3 and 4, the fan 42 may be mounted to the second enclosure 48 at the aperture 50. In such construction of the RESS 22, the space inside the second enclosure 48 and external the first enclosure 32 defines the immediate environment 36 external to the first enclosure. The second enclosure 48 may further include a baffle 52 mounted at an aperture 54 and configured to admit ambient airflow 56 (shown in FIGS. 3 and 4) into the environment 36 inside the second enclosure 48, from an environment 58 external to the second enclosure 48. The baffle 52 may be a passive or static device (not shown) configured to maintain an open state with respect to each of the ambient environment 58 and the environment 36 inside the second enclosure 48. Alternatively, the baffle 52 may be a dynamically controlled device, such as a shutter having a plurality of louvers (shown in FIGS. 3 and 4). In the latter case, the electronic controller 24 may be configured to regulate operation of the baffle 52, i.e., open the baffle in response to the temperature inside the first enclosure 32 reaching the predetermined value 46, such as via one of the algorithms 24C.

Overall, the RESS 22 is equipped with a crossflow arrangement in its enclosure to mitigate a thermal runaway that has already affected at least one of the constituent battery modules. Specifically, the RESS 22 includes meltable phase-change material (PCM) device(s) 40 in combination with one or more vents to generate such a crossflow ventilation to open a path for the airflow through one or more enclosures in response to module(s) undergoing the thermal runaway event 41. The RES S 22 may further include passive or actively controlled devices, such as the fan 42 and the baffle 52, to facilitate crossflow ventilation in the enclosure housing the modules 30.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A multi-cell rechargeable energy storage system (RESS) comprising:
   a plurality of battery cells organized into battery modules;
   a first enclosure configured to house the battery modules;
   a first vent arranged on the first enclosure and configured to direct air from inside the first enclosure to an environment external to the first enclosure;
   a second vent arranged on the first enclosure and configured to direct air into the first enclosure from the environment external to the first enclosure; and
   a phase-change material (PCM) device arranged on the second vent and configured to melt in response to at least one of the battery modules experiencing a thermal runaway event, and thereby, in combination with the first vent, generate crossflow ventilation through the first enclosure to cool the battery modules therein and mitigate thermal runaway.

2. The multi-cell RESS of claim 1, wherein the RESS system is a stationary system further comprising a second enclosure configured to house the first enclosure including the battery modules.

3. The multi-cell RESS of claim 2, wherein the second enclosure includes a baffle configured to admit airflow into the second enclosure from an environment external to the second enclosure.

4. The multi-cell RESS of claim 1, further comprising a fan configured to pull, through the first vent, the air directed by the first vent from inside the first enclosure and thereby exhaust the air to the environment external to the first enclosure.

5. The multi-cell RESS of claim 4, further comprising an electronic controller configured to regulate operation of the fan in response to temperature detected inside the first enclosure.

6. The multi-cell RESS of claim 1, wherein the PCM device is a stainless-steel tape.

7. The multi-cell RESS of claim 1, wherein the PCM device is a thermoset molded component, and wherein the material of the PCM device is a polymeric composite.

8. The multi-cell RESS of claim 1, wherein the PCM device is a thermoplastic injection molded component, and wherein the material of the PCM device is polyamide 6 reinforced with 15% glass fiber (PA6-GF15).

9. A motor vehicle comprising:
a power-source; and
a multi-cell rechargeable energy storage system (RESS) configured to supply electrical energy to the power-source, the multi-cell RESS including:
a plurality of battery cells organized into battery modules;
a first enclosure configured to house the battery modules;
a first vent arranged on the first enclosure and configured to direct air from inside the first enclosure to an environment external to the first enclosure;
a second vent arranged on the first enclosure and configured to direct air into the first enclosure from the environment external to the first enclosure; and
a phase-change material (PCM) device arranged on the second vent and configured to melt in response to at least one of the battery modules experiencing a thermal runaway event, and thereby, in combination with the first vent, generate crossflow ventilation through the first enclosure to cool the battery modules therein and mitigate thermal runaway.

10. The motor vehicle of claim 9, wherein the multi-cell RESS additionally includes a fan configured to pull, through the first vent, the air directed by the first vent from inside the first enclosure and thereby exhaust the air to the environment external to the first enclosure.

11. The motor vehicle of claim 10, further comprising an electronic controller configured to regulate operation of the fan in response to temperature detected inside the first enclosure.

12. The motor vehicle of claim 9, wherein the PCM device is a stainless-steel tape.

13. The motor vehicle of claim 9, wherein the PCM device is a thermoset molded component, and wherein the material of the PCM device is a polymeric composite.

14. The motor vehicle of claim 9, wherein the PCM device is a thermoplastic injection molded component, and wherein the material of the PCM device is polyamide 6 reinforced with 15% glass fiber (PA6-GF15).

15. A stationary multi-cell rechargeable energy storage system (RESS) comprising:
a plurality of battery cells organized into battery modules;
a first enclosure configured to house the battery modules;
a second enclosure configured to house the first enclosure including the battery modules;
a baffle configured to admit airflow into the second enclosure from an environment external to the second enclosure;
a first vent arranged on the first enclosure and configured to direct air from inside the first enclosure to an environment external to the first enclosure;
a second vent arranged on the first enclosure and configured to direct air into the first enclosure from the environment external to the first enclosure; and
a phase-change material (PCM) device arranged on the second vent and configured to melt in response to at least one of the battery modules experiencing a thermal runaway event, and thereby, in combination with the first vent, generate crossflow ventilation through the first enclosure to cool the battery modules therein and mitigate thermal runaway.

16. The stationary multi-cell RESS of claim 15, further comprising a fan configured to pull, through the first vent, the air directed by the first vent from inside the first enclosure and thereby exhaust the air to the environment external to the first enclosure.

17. The stationary multi-cell RESS of claim 16, further comprising an electronic controller configured to regulate operation of the fan in response to temperature detected inside the first enclosure.

18. The stationary multi-cell RESS of claim 15, wherein the PCM device is a stainless-steel tape.

19. The stationary multi-cell RESS of claim 15, wherein the PCM device is a thermoset molded component, and wherein the material of the PCM device is a polymeric composite.

20. The stationary multi-cell RESS of claim 15, wherein the PCM device is a thermoplastic injection molded (engineering plastic) component, and wherein the material of the PCM device is polyamide 6 reinforced with 15% glass fiber (PA6-GF15).

* * * * *